Jan. 1, 1963    R. Q. SKRMETTA    3,070,833
METHOD FOR PEELING SHRIMP
Filed Nov. 30, 1960    4 Sheets-Sheet 1
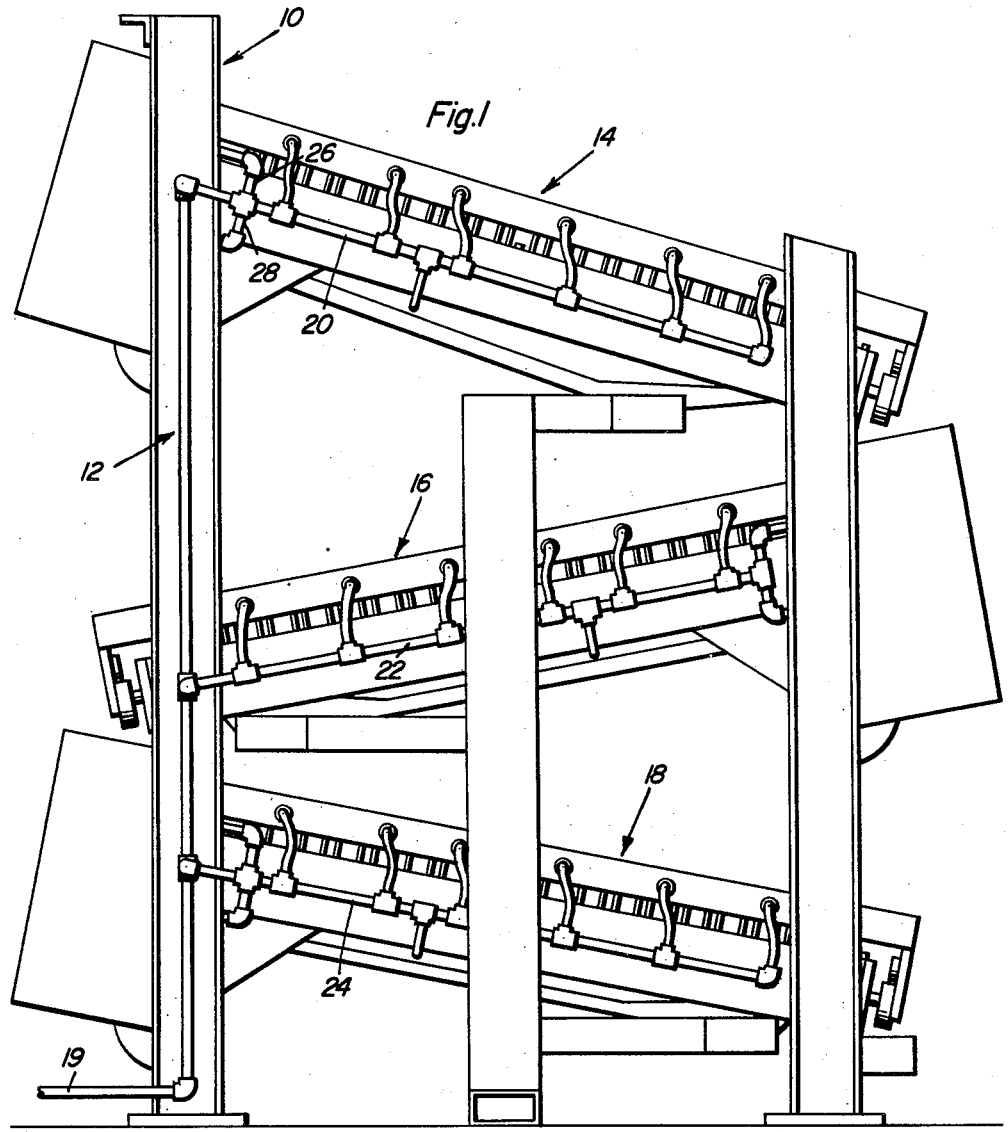
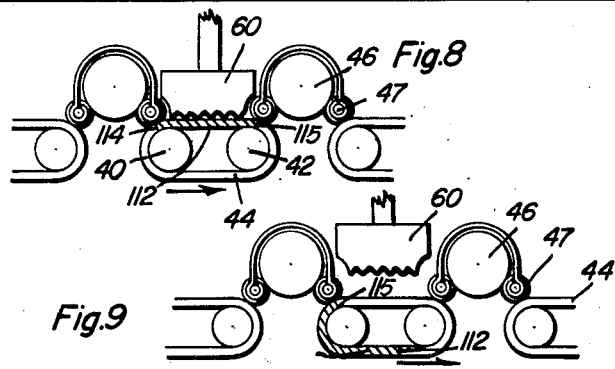
Raphael Q. Skrmetta
INVENTOR.

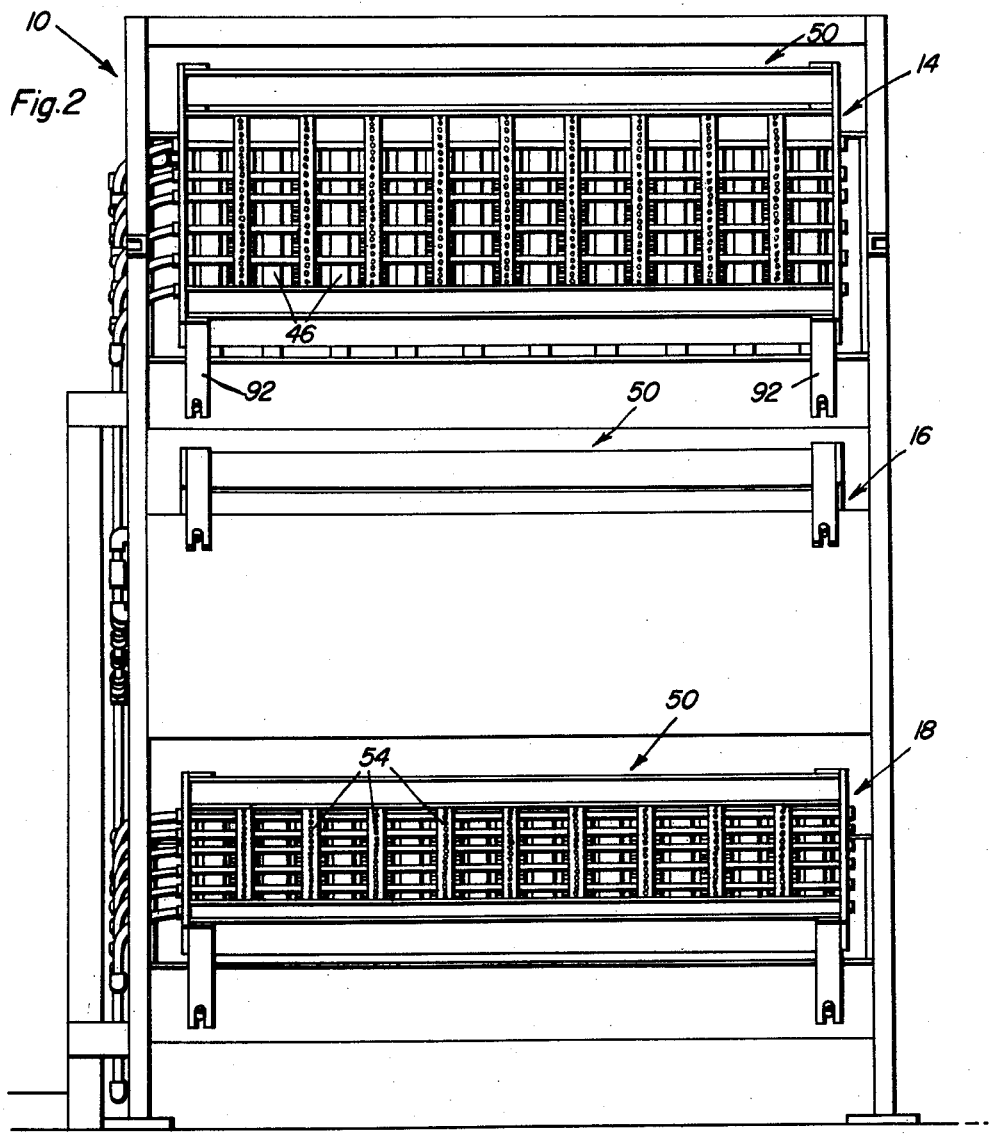
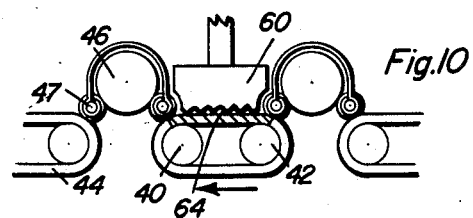
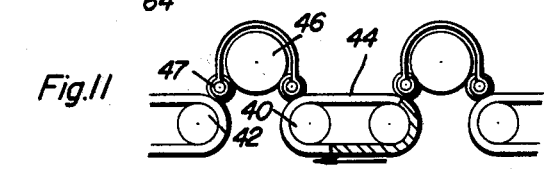

Jan. 1, 1963  R. Q. SKRMETTA  3,070,833
METHOD FOR PEELING SHRIMP
Filed Nov. 30, 1960  4 Sheets-Sheet 3
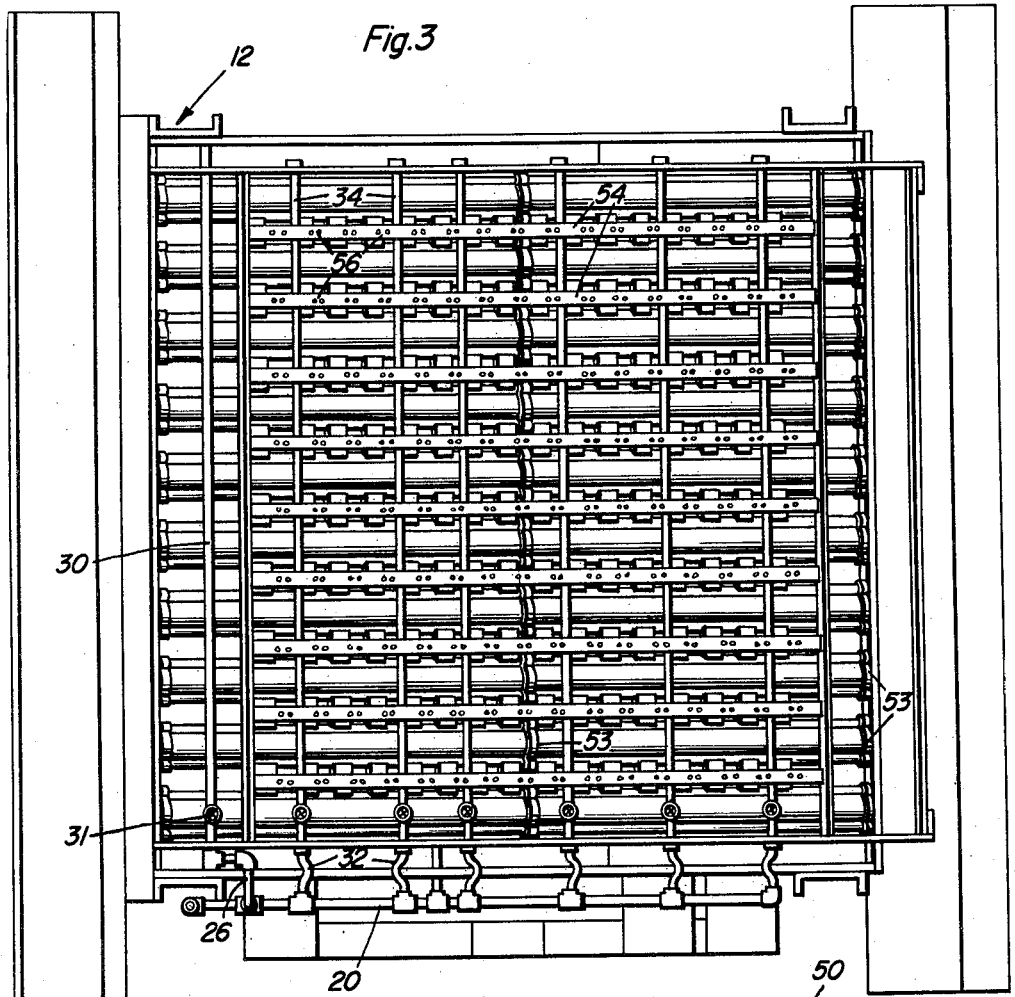
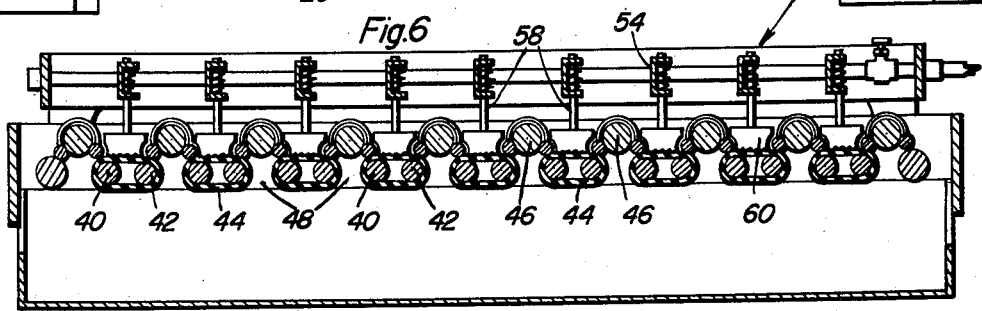
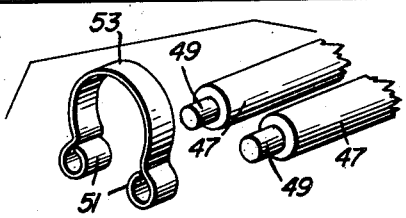
Raphael Q. Skrmetta
INVENTOR.

Jan. 1, 1963   R. Q. SKRMETTA   3,070,833
METHOD FOR PEELING SHRIMP

Filed Nov. 30, 1960   4 Sheets-Sheet 4

Raphael Q. Skrmetta
INVENTOR.

BY *Clarence A. O'Brien*
*and Harvey B. Jackson*
Attorneys

3,070,833
METHOD FOR PEELING SHRIMP
Raphael Q. Skrmetta, % Deepsouth Packing Co. Inc., 3536 Lowerline St., New Orleans 18, La.
Filed Nov. 30, 1960, Ser. No. 72,730
20 Claims. (Cl. 17—45)

This invention comprises a novel and useful method for peeling shrimp and constitutes a continuation-in-part of my prior application, Serial No. 706,806, filed January 2, 1958, for Assister Peeler for Shrimp Peeling Machines, now Patent No. 2,976,564, granted on March 28, 1961, and further constitutes an improvement upon the prior patent of Paul C. Skrmetta, Patent No. 2,781,544, issued February 19, 1957, for Seafood Cleaning Machine.

The principal object of this invention is to provide a method which will facilitate and render more effective the peeling of the shell from shrimp in certain types of shrimp peeling machines.

In certain conventional types of automatic shrimp peeling machines, the shrimp are caused to pass either by gravity or by the flow of water downwardly along a trough while they are caused to move back and forth from one side of the trough to the other to successively engage peeling rollers or other peeling instrumentalities disposed at the opposite sides of and constituting the opposite sides of the trough. In such machines, it frequently occurs that owing to their velocity of travel, shrimp may tend to bunch up in groups and substantially fill the trough, so that individual shrimp may pass the entire length of the trough with relatively few if any engagements of the shrimp with the peeling elements on opposite sides of the trough.

It is therefore the primary purpose of this invention to provide a method which will overcome the aforementioned difficulty encountered in prior peeling machines and will positively insure that the shrimp will necessarily pass repeatedly back and forth across the trough from one peeling element to the other side of the trough and back again a number of times before they complete their passage longitudinally of the trough, thereby insuring numerous different engagements of the shrimp with the peeling elements.

A further important object of the invention is to provide a method whereby the shrimp during their to and fro or back and forth passage across a trough between opposed peeling elements will be repeatedly halted and subjected to a conditioning operation for loosening the shell of the shrimp in preparation for the next engagement of the shrimp and shell with a peeling element.

An additional object is to provide a means and method whereby travel of the shrimp back and forth between peeling elements will be temporarily retarded and/or halted while a compressive and rolling action may be given to the shrimp and/or its shell whereby to facilitate loosening of the shell upon the shrimp.

Yet another object is to provide a means and method whereby shrimp may be beneficially treated in accordance with the foregoing objects and which will permit handling shrimp of various sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a suitable embodiment of a shrimp peeling machine capable of performing the method of this invention and which machine is constructed in accordance with the invention disclosed and claimed in my above-identified application;

FIGURE 2 is an end elevational view taken from the lower or right end of the machine of FIGURE 1 and showing the disposition of the peeling troughs and of the assister peelers of the upper and lower trays or tiers of the machine;

FIGURE 3 is a top plan view of one of the tiers of the machine as for example the top tier of FIGURES 1 and 2;

FIGURE 6 is a vertical transverse sectional view through one of the trays or tiers of the machine and showing the disposition of the various troughs therein and the association of the assister peelers therewith;

FIGURE 7 is a detail perspective view showing a resilient retainer for a pair of insert rollers disposed between the conveying belts and the peeling rollers of the machine; and FIGURES 8–11 are diagrammatic views showing in sequence the operation of the assister peelers and the method in accordance with this invention.

Figure 4:
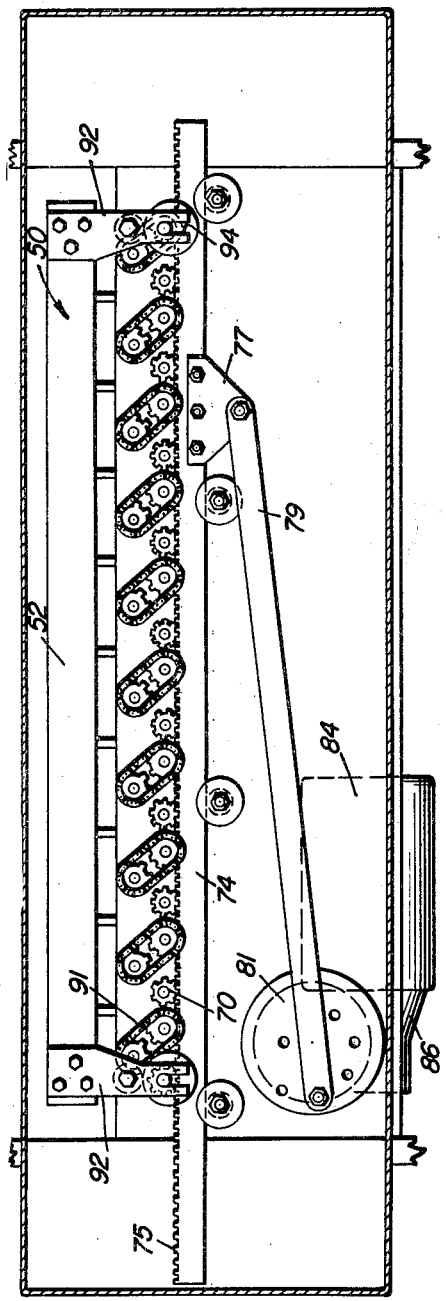
FIGURE 4 is a view in vertical section through a portion of the machine showing a portion of the driving means for effecting the oscillation of the various rollers of the machine.

Indicated in FIGURES 1–6 of the drawings is any suitable form of a shrimp peeling machine, as for example an apparatus of the same or similar construction to that disclosed in my above-identified copending application or that disclosed in the prior patent of Paul C. Skrmetta above-mentioned. Since the invention disclosed and claimed herein resides in a method of peeling shrimp which may be performed by the apparatus disclosed in my above-mentioned prior application, a completely detailed description of the same is deemed to be unnecessary, most portions of the apparatus to which the method claimed herein relates being however illustrated and described generally hereinafter.

A suitable embodiment of apparatus for carrying out the method of this invention, as illustrated in the accompanying drawings, is indicated generally by the numeral 10, and consists of a supporting framework indicated generally at 12 consisting of vertical, longitudinal and transverse members suitably connected together for supporting thereon and therebetween a plurality of vertically spaced shrimp cleaning units, three such units being shown in FIGURE 1 and being designated generally by the numerals 14, 16 and 18 respectively. These units are inclined to the horizontal, adjacent units being oppositely inclined, and the units are so disposed that shrimp being fed by any suitable means into the upper unit will travel by gravity down the length of the same, and will then successively fall upon and pass along successive lower units.

It is evident that any desired number of the shrimp cleaning units may be employed. For convenience of illustration, only three such units have been indicated in the drawings, although more or less may be provided as desired and in some instances, a single unit may be found satisfactory for the purposes of this invention. Inasmuch as the construction and operation of the units are substantially identical, the description of one will suffice for an understanding of all, and it is therefore to be understood that the showing and numerals appearing in FIGURES 3–6, as well as in the diagrammatic views of FIGURES 8–11 may be considered as applicable to all of the units.

It is also contemplated that the dimensions of the oscillating belt constituting the flat shrimp supporting platforms, of the peeling rollers, of the assister peeler elements may be varied within the sphere of this invention as desired.

Water is supplied to the upper ends of each of the units for the purpose of facilitating passage of the shrimp under the influence of gravity down the inclined troughs provided by each cleaning unit. The water introduced may be in the form of a spray, and such has been illustrated in the accompanying drawings. It is however also possible to apply just a sufficient quantity of water to maintain the sliding surfaces moist and wet whereby gravity alone will suffice to cause descent of the shrimp through the troughs of the cleaning units.

Referring again to FIGURE 1 it will be observed that a pipe 19 serves to supply water from any suitable source to each of the cleaning units of the apparatus. For that purpose, branch conduits 20, 22 and 24 communicate with the supply conduit 19 and extend along the sides of each of the trays or tiers. From each of the branch conduits additional conduits as at 26, and 28 communicate with suitable transverse headers such as that shown at 30 which extend tranversely across all of the troughs of the tray or tier and by means of a control valve 31 and appropriately directed spray nozzles, not shown, direct sprays of water upon the upper ends of each of the troughs of the tray or tier and into the sump therebeneath. Further additional branch conduits as at 32 connect the manifolds 20 to additional transverse headers 34 which overlie the troughs and are disposed at longitudinally spaced intervals along the length of these troughs to direct a cleaning spray downwardly into the troughs and upon the shrimp passing downwardly therealong. It will thus be apparent that water is supplied to the upper ends of each of the troughs to facilitate and/or cause the passage of shrimp to flow downwardly therealong while water is also directed upwardly beneath each of the troughs and to the sump therebeneath for cleaning the same. In addition, further sprays along the length of the trough are directed downwardly thereinto to facilitate the washing and cleaning of shrimp during the peeling operation being performed during the passage of the shrimp through these troughs.

Figure 5:
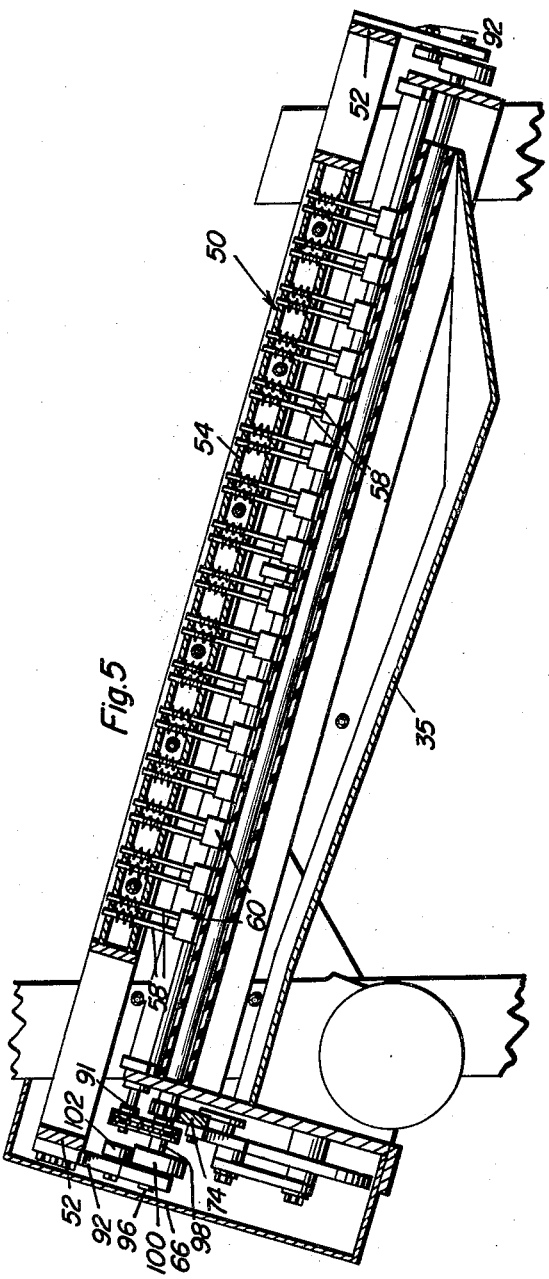
FIGURE 5 is a vertical longitudinal sectional view through one of the peeling troughs of the machine showing the association therewith of the assister peelers.

Each of the cleaning trays or units has secured therebeneath a sloping pan or sump 35, see FIGURE 5, to collect the water and the trash falling from the cleaning elements of the cleaning units for subsequent removal and disposal as desired.

As further shown in FIGURE 5, shrimp discharged from the lower end of the lowermost cleaning unit 18 drop into a suitable conveyor, not shown, from which they are delivered to any suitable station for packaging, or subsequent treatment or for any other purpose.

Referring now more specifically to FIGURES 3 and 6, it will be seen that each of the cleaning units or trays 14, 16 or 18 comprises a plurality of inclined troughs disposed in side-by-side relation, each trough consisting of a pair of longitudinally extending stationarily mounted horizontally inclined rollers 40 and 42. Endless flexible belts 44 which may be of rubber or the like are entrained about and embrace substantially the entire length of the pairs of rollers 40 and 42 as will be apparent from FIGURE 3. It will be observed that the arrangement is such that a roller 40 is disposed beyond one side of a series of belted pairs of rollers while the rollers 42 are disposed beyond the other side of the same for a purpose to be subsequently set forth.

Each of these rollers 40, 42 is driven in fixed timed relation to each other for oscillatory rotation by a means to be subsequently described. Peeler rollers 46 are disposed above and at opposite sides of each of the belts 44 and may either rest directly upon the belts as disclosed in my above-identified prior copending application or in the above-identified patent of Paul C. Skrmetta or may have a pair of insert rollers each indicated by the numeral 47, see FIGURE 7, disposed therebetween. In order to facilitate the insertion of the insert rollers and their removal if desired, the insert rollers are provided with axially extending diametrically reduced trunnions as at 49 which are received in retaining eyes or sleeves 51 formed in a leaf spring 53. As shown in FIGURE 6, this spring is adapted to engage over one of the peeling rollers 46 and thus yieldingly to retain the pair of insert rollers disposed between this peeling roller and the two adjacent belts.

The peeler rollers and the insert rollers are of any desired length and may for example be of the same length as the belts and the supporting rollers 40, 42 and are frictionally oscillated in response to and by means of the oscillation of the supporting rollers and the belt entrained thereover.

For the reasons set forth more clearly in the above-mentioned patent to Paul C. Skrmetta and my prior above-identified application, oscillation of the belts 44 and of the peeling rollers 46 associated therewith serves to unwind and peel the shells or hulls from the shrimp, the shells, hulls and other trash passing between the peeling rollers, and/or the belts and the insert rollers and are then dropped and discarded through the throats or openings 48 between adjacent belts into the sloping pan or sump 35 previously mentioned.

It will be understood that the top surface of the belts 44 provides a flat, transversely and horizontally reciprocating shrimp supporting surface, whereby as the belts reciprocate, the shrimp will be thrown on the belts from side-to-side against the rollers 46, 47 at opposite sides of the belts.

Inasmuch as the construction of belts, rollers and peeling rollers, except for the insert rollers, form a part of the invention in the above-mentioned patent and application, a further detailed description of the operation of the same is deemed to be unnecessary herein.

It may be here noted, however, that any desired extent of oscillatory or reciprocatory movement may be imparted to the belts 44. In general, however, it is preferred that these belts shall be given at least one and preferably shall exceed one complete revolution in each direction of travel during their reciprocation. In order to obtain any desired length of travel of the belts during the oscillation or rotary reciprocation thereof, adjustments may be made in the driving mechanism to be subsequently set forth.

Cooperating with the structure above-mentioned is an assister peeler construction forming the subject matter of my above-identified prior copending application and which serves to increase the efficiency of the above-described apparatus.

Each of the trays or cleaner units is provided with an assister peeler. The latter consists of a supporting frame 50 which is mounted for vertical reciprocation relative to the belts in timed relation to the oscillatory reciprocatory rotation of the belts 44 in a manner to be now set forth.

The frame 50 consists of a pair of parallel beams comprising end members 52 together with a plurality of parallel bars or beams 54 comprising cross members which are connected to the end members. There is provided one such bar or beam 54 for each of the belts 44, and the member 54 is disposed above and between adjacent peeler rollers 46 as will be best apparent from FIGURE 3.

The bars 54 are longitudinally slotted or apertured as at 56 and loosely and slidably secured in each of the slots or apertures are the stems 58 of a presser member 60, cotter pins or other suitable fasteners being provided in the stems to retain the presser members in vertically and loosely sliding engagement in the slots 56 of the bars 54.

The bottom surfaces of the presser members 60 are preferably serrated as shown at 64, see FIGURES 8–10, and are disposed in parallel relation with the top surface of the belt 44 immediately therebeneath.

Each of the cleaner units is provided with a housing 66 which contains the mechanism for operating the support rollers and belts and also for imparting reciprocatory movement to the supporting frame 50 of the assister peelers. Supported in the housing 66 for transverse reciprocation therein is a rack bar 74 whose upper toothed surface 75 is continuously engaged with the gear 70 provided on the projecting end above-mentioned of one of the support shafts 40 and 42 of each group. The lower surface of the rack bar has secured thereto a bracket 77 which is connected as by a connecting rod or link 79 and a crank disk 81 which is driven by an electric motor 84 having a reduction gear assembly 86. Thus, rotation of the crank disk 81 will impart reciprocation to the rack 74 and thus in turn will impart oscillatory rotation to one of the shafts 40 or 42. By virtue of the belt connection between the shafts 40 and 42, it is thus evident that a reciprocatory travel be given to the belts and to the insert rollers engaging the same and further to the peeling rollers if the insert rollers are dispensed with and the peeling rollers should directly engage the belts as in my prior above-identified application.

It will be understood that any suitable means may be provided in order to vary the amplitude of the reciprocation of the rack bar 74 and thus vary the amplitude of the oscillatory or reciprocatory movement of the support rollers and the belts.

As further suggested in FIGURES 4 and 5, a drive means such as a sprocket chain 91 may be utilized to positively drive the peeling rollers 46 from one of the support rollers 40 or 42.

As will be further apparent from FIGURES 4 and 5, the supporting frame 50 of the assister peelers is carried by a pair of depending legs 92 at each extremity of the beams 52 these legs being bifurcated at their lower ends as at 94 to straddle and be guided upon the projecting extremities 96 of a shaft portion 98. The latter may constitute a separate lay shaft suitably mounted in the casing or may constitute an extension of certain of the support rollers 40, 42. Carried upon the shaft extension 98 is a cam 100 cooperating with cam rollers 102 journaled upon the legs 92. The arrangement is such that in timed relation to oscillation of the belts 44 by the rack 74, a corresponding vertical reciprocation will be given to the frame 54 and thus to the assister peelers 60 carried thereby.

In the diagrammatic views of FIGURES 8–11 it will be observed that the assister peelers 60 have been shown in their lowered position as closely approaching the top surface of the belts 44, and as having their opposite sides closely adjacent to the peelers 46. This showing is considerably exaggerated since in actual practice it is preferred that the lower serrated surface 64 of the assister peelers shall never engage the top surface of the belts 44, but shall approach sufficiently close thereto merely to engage and press upon a shrimp lying upon that surface without danger of crushing or unduly mashing the shrimp but with sufficient force to slightly compress the shell of the shrimp upon its body and thereby effect a loosening of the shell thereon.

Further, the opposite sides of the assister peeler 60 are spaced definitely a considerable distance from the adjacent peeling rollers 46 and the insert rollers 47 as for example by being relieved or cutaway as at 110 to provide adequate clearance at this point. The purpose of this clearance is to insure that the assister peeler shall in no case tend to squeeze or press the shrimp into the peeling crotches formed between the engaging moving surfaces of the belt 44, the insert rollers 47 or the peeler rollers 46. The purpose of the assister peeler far from urging the shrimp into the nips or peeling crotches is intended to halt the travel of the shrimp thereto and for at least a portion of the oscillatory movement of the belt to roll the shrimp over upon its longitudinal axis for preventing it from progressing substantially toward the peeling elements. This action of the assister peeler serves as a preliminary or preparatory treatment of the shrimp and will in some instances be sufficient to completely loosen and possibly remove the shell from the shrimp but in any event will assist in loosening the shell to such an extent that the shrimp will be more effectively peeled when it subsequently reaches the next peeling element.

The method of operation of the shrimp peeling machine to which the assister peeler has been applied is as follows:

Shrimp are discharged by any suitable means to the uppermost end of the topmost cleaning unit and then will pass by gravity down the inclined troughs formed by the top shrimp supporting surfaces of the belts 44 and the two adjacent peeling rollers 46 and their insert rollers if the latter are provided. During this descent of the shrimp gravity alone may be relied upon to cause the shrimp to move downwardly over the surfaces wet from the water supplied thereto, or in some instances it may be preferred to employ the forces of the water spray to assist in causing downward travel of the shrimp. In any event, as the shrimp slide down the inclined troughs, they will be thrown from one side to the other by the oscillating or reciprocatory rotation of the belts. Thus, the shrimp will be delivered to first one of the rollers 46 by the movement of the belt and thereafter will be thrown to the other roller across the trough from the first roller. As the shrimp is carried to the crotch between a roller and the surface of the belt 44 or the surface of the insert roller 47, the shell or hull of the shrimp will be thrown into the crotch between the roller 46 and the insert roller or the nip formed between the belt 44 and the insert roller, or between the belt and roller 46 if the insert rollers are omitted and drawn from the shrimp and discharged through the throat 48.

It sometimes happens however that the crotch formed by the roller or rollers and/or the belt fails to catch the shell or hull of the shrimp as soon as the shrimp is brought into contact with this crotch, so that when the belt reverses its direction of travel, some of the shrimp may not travel all the way across to the opposite roller and crotch before the belt again reverses its rotation. Such shrimp may then tend to pass downwardly down the trough without being completely and effectively treated by the peeling elements. It is for this purpose that the assister peelers of this invention are provided.

Still further, the timed reciprocation of the assister peelers with respect to the belts serve to halt the free travel of shrimp down the trough without engagement of the rollers. Actually the timed relation is such that preferably the descending assister peelers stop each of the shrimp several times and possibly twelve of fourteen times during the progress of the shrimp from one end of the trough to the other. The shrimp are thus confined to a step-by-step progress down the trough thereby affording ample time for numerous passages of the shrimp back and forth between one peeling element to the other. In addition, each time the shrimp is stopped in its downward travel it is rolled over upon itself under pressure thereby further loosening its shell and rendering it susceptible to more effective treatment by the peeling elements.

As hereinbefore set forth, there is a timed relation between the vertical reciprocation of the presser members 60 and the rotation of the belts 44. The arrangement is such that after the initial travel of the belt from one direction, with the presser member being raised so as not to interfere with the passage of the shrimp, from one roller to the other, the presser members are lowered so that they will catch and rest upon any shrimp which have not completed their travel across the belt to the opposite roller. Thereafter, during the completion of the travel of the belt in the same direction, the shrimp will be held in place so that the movement of belt will cause rotation of the shrimp between the belt and the assister peeler, thereby facilitating the loosening of the shell or hull from the shrimp and preparing it for more effective engagement by a crotch of the belt and roller upon reversal of movement of the latter. To facilitate this operation, it will be observed that the relatively non-slipping surface 64 of the assister peeler will confine the shrimp in place therebeneath while the travel of the belt will cause the shrimp to rotate upon its longitudinal axis.

When the belt starts its reverse travel, the presser members are all raised, so that the shrimp caught between the rollers will at once move to and be the first shrimp to engage in the opposite crotch of the through.

Referring first to FIGURE 8 it will be assumed that the belt 44 is ready to begin its movement in the direction indicated by the arrow in the figure. The shaded portion of the belt indicated by the numeral 112 has one extremity 114 disposed in contact with the roller which is adjacent the support roller 40 while the other extremity 115 of this portion of the belt is in contact with the peeling roller which is adjacent to the other support roller 42. At this time it will be assumed that the presser member 60 it lowered until it is either closely adjacent to the belt if there is no shrimp therebeneath or rests upon a shrimp if one is supported by the belt therebeneath.

After a predetermined interval of travel of the belt in the direction indicated by the arrow the portion 112 has moved from the position shown in FIGURE 8 to that shown in FIGURE 9, and any shrimp beneath the presser member is at this time rotated upon its axis to loosen the shell thereon as previously mentioned. Upon the completion of the rotation of the belt in one direction as shown in the position of FIGURE 9, the assister peeler 60 is lifted and the direction of rotation of the belt is then reversed. During this reversal shrimp are carried across the trough to the other peeling roller. At an appropriately timed interval in this travel the assister peeler is again lowered as in FIGURE 10 thereby trapping any shrimp which have not completed their travel across the belt from one crotch to the other and again conditioning the shrimp for the next reversal of the travel of the belt.

It will be understood that any desired length of travel may be given to the belt and this is preferably adjustable from about 6 inches to 8 inches with the belts having a circumferential extent of about 10.78 inches, and further, any desired time may be chosen for lowering of the presser members 60 and there may be retained lowered for any desired duration.

An important feature of the method of operation of this invention is that during each cycle of reciprocatory oscillation of the belt in opposite directions, for a part of the travel in each direction the assister peeler is lowered to trap shrimp against the moving belt and thus effect rotation of the shrimp while they are being compressed in order to loosen the shell thereof.

One satisfactory arrangement and timing of the device may comprise a ten inch travel of the belt in each direction of rotation with the portion 112 being about four inches in length. It is understood, however, that the invention is not limited to any particular dimensions or timing of the elements.

In a preferred arrangement, the assister peeler is raised when the belt is at zero travel or its rest position; is moved about ½ of its down travel when the belt is at its position of ¼ travel; is moved to its full lowered position of about ½ of the belt travel; is lifted to its ½ raised position at ¾ of the belt travel and is back at its fully raised position upon completion of the belt travel.

It will be appreciated that the belts 44 possess to a significant degree the inherent property of being yieldable or deflectable under the downward pressure of the assister peelers 60 and the shrimp thereon. This flexibility enables the belt to yield or deflect downwardly to a varying extent and thereby accommodate without damage different sizes of shrimp while according to each of the latter the desired conditioning treatment. Thus adequate force is applied to the larger and tougher shrimp while the smaller and tenderer shrimp are not crushed.

Although the foregoing specification has emphasized the function of the assister peelers in temporarily halting, interrupting or stopping the progress of the shrimp from the peeling element at one side of the trough towards that at the other side, it is to be understood that there is a considerable diversity in this action.

In some instances, shrimp will be held and their further progress completely halted. In other instances the progress of the shrimp will be retarded or delayed rather than completely halted while they are passed between the belt and the assister peeler.

Regardless of which operation occurs the shrimp still receive the same basic treatment or conditioning. Sometimes the shrimp will be rolled over upon themselves about their longitudinal axes while other times they may be held substantially stationary. But in any event, they will be subjected to compressive force produced by the downward thrust of the assister peelers and the upward push of the downwardly flexed belts while the continued travel of the belt and the frictional drag of the assister peeler will serve to deform and loosen the shell and tend to pull it from the shrimp.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of treating shrimp comprising: reciprocatingly moving shrimp to and from a peeling station, periodically halting travel of said shrimp to said peeling station and at a distance therefrom, applying pressure to the shrimp and rolling it about its longitudinal axis and thereby loosening the shell of the shrimp while the travel of the shrimp to said peeling station is temporarily halted.

2. The method of claim 1, including the further step of releasing the pressure applied to the shrimp and resuming movement of the shrimp to said peeling station.

3. A method of treating shrimp comprising: reciprocatingly moving shrimp back and forth from a first peeling station to a spaced second peeling station, periodically halting travel of said shrimp from one station to the other at a position spaced from each station, applying pressure to the shrimp and rolling it about its longitudinal axis and thereby loosening the shell of the shrimp while the travel of the shrimp between said stations is temporarily retarded.

4. The method of claim 3, including the further step of releasing the applied pressure and resuming movement of the shrimp to said other peeling station.

5. The method of claim 3, wherein said pressure is applied to said shrimp upon each movement of the shrimp from said first station to said second station.

6. The method of claim 3, wherein said pressure is applied to said shrimp upon each movement of shrimp between said stations.

7. The method of claim 1, wherein said pressure is applied to said shrimp upon each movement of the shrimp towards said station.

8. The method of claim 1, wherein said pressure is applied to said shrimp upon each movement of said shrimp towards and from said station.

9. The method of claim 1, including maintaining said applied pressure until movement of the shrimp in an opposite direction is begun.

10. The method of claim 3, including maintaining said applied pressure until movement of the shrimp in an opposite direction is begun.

11. A method of treating shrimp comprising; moving shrimp in a longitudinal path of travel while reciprocatingly moving said shrimp transversely of said longitudinal travel to and from a peeling station, periodically and intermittently retarding longitudinal travel of said shrimp whereby to increase the reciprocatory movements of said shrimp to and from said station relative to the longitudinal travel of said shrimp, periodically halting travel of said shrimp to said peeling station and at a distance therefrom, applying pressure to the shrimp and rolling it about its longitudinal axis and thereby loosening the shell of the shrimp while the travel of the shrimp to said peeling station is temporarily halted.

12. The method of claim 11, wherein the step of halting longitudinal travel and the step of temporarily halting reciprocatory movement of the shrimp are simultaneously effected.

13. A method for conditioning shrimp comprising moving shrimp along paths of travel lying in a common plane and between two spaced positions, temporarily halting movement of the shrimp during a portion only of their movement in each path of travel, during said temporary halting applying pressure to the shrimp while rolling the shrimp about its longitudinal axis and thereby loosening the shell of the shrimp.

14. A method of conditioning shrimp for peeling comprising intermittently moving shrimp back and forth between stations on opposite sides of a longitudinal path of travel upon a flat supporting surface, periodically halting said back and forth movement of said shrimp while applying pressure to the shrimp and rolling the latter about its longitudinal axis whereby to loosen the shell of the shrimp.

15. A method of loosening the shell of shrimp which comprises the steps of moving shrimp between two stations across a flat, yieldable surface, temporarily halting travel of shrimp across said surface, applying pressure to the shrimp and compressing it against said surface with a force sufficient to temporarily deform the shell and body of the shrimp but insufficient to damage its meat and while applying pressure rolling the shrimp upon its longitudinal axis whereby to loosen the shell of the shrimp and thereafter releasing said pressure and completing the movement of shrimp between said stations.

16. A method for conditioning shrimp which comprises the steps of supporting shrimp upon a generally flat but concavely yieldable surface, intermittently moving said shrimp across said surface back and forth between spaced locations, temporarily halting travel of said shrimp between said stations, applying to said shrimp during the temporary halting of their travel a pressure sufficient to temporarily compress and deform the shell and body of the shrimp but insufficient to damage its meat, during the applying of said pressure turning the shrimp about its longitudinal axis and thereby loosening the shell from the shrimp.

17. The method of claim 16 including the step of peeling loosened shell from the shrimp at one of said locations and further including intermittently moving the shrimp along said surface in a direction transverse to said movement along said surface.

18. The method of claim 16 including the step of peeling loosened shell from the shrimp at both of said locations and further including intermittently moving the shrimp along said surface in a direction transverse to said movement along said surface.

19. The method of claim 16 including the step of peeling loosened shell from the shrimp at both of said locations and wherein the step of temporary halting occurs during an intermediate portion only of each movement between said locations.

20. The method of claim 16 including intermittently moving the shrimp along said surface in a direction transverse to said movement along said surface and wherein the step of temporary halting occurs during an intermediate portion only of each movement between said locations.

References Cited in the file of this patent

UNITED STATES PATENTS

| | | |
|---|---|---|
| 2,537,355 | Lapeyre et al. | Jan. 9, 1951 |
| 2,778,055 | Lapeyre et al. | Jan. 22, 1957 |